United States Patent [19]

Rensink

[11] Patent Number: 4,513,361
[45] Date of Patent: Apr. 23, 1985

[54] MULTI-PHASE DC-TO-AC AND DC-TO-DC BOOST CONVERTER

[75] Inventor: Loman Rensink, Tujunga, Calif.
[73] Assignee: Hughes Aircraft Company, El Segundo, Calif.
[21] Appl. No.: 466,404
[22] Filed: Feb. 15, 1983
[51] Int. Cl.$^3$ ............................................. H02M 3/335
[52] U.S. Cl. ...................................... 363/21; 363/61; 323/222
[58] Field of Search ................... 323/222, 259; 363/15, 363/16, 20, 21, 27, 28, 59, 60, 61

[56] References Cited

U.S. PATENT DOCUMENTS 4,274,132 6/1981 Molyneux-Berry ................... 363/21

Primary Examiner—Peter S. Wong
Assistant Examiner—Anita M. Ault
Attorney, Agent, or Firm—Charles D. Brown; A. W. Karambelas

[57] ABSTRACT

A multi-phase DC-to-AC voltage boosting converter suitable for use as the primary stage of power isolated, high output voltage DC-to-DC voltage converters. The converter is comprised of a plurality of transformer primary windings electrically interconnected in a single loop mesh configuration and a plurality of voltage boosting channels operatively associated with the respective primary windings and commonly connected to a low voltage power source. The phase channels are operated so as to periodically provide a boosted voltage potential to the primary windings in a continuously cycling, multi-phase synchronous relation to one another so that a corresponding multi-phase, high-voltage AC potential is provided across each of said primary windings. Various conventional AC-to-DC converters and voltage multiplier circuits may be inductively coupled to the transformer primary windings to provide a wide variety of highly efficient low-to-high voltage DC-to-DC boost converters.

12 Claims, 8 Drawing Figures

MULTI-PHASE DC-TO-AC AND DC-TO-DC BOOST CONVERTER

BACKGROUND OF THE INVENTION

The present invention generally relates to power converters and, more specifically, to high-power, low-to-high voltage DC-to-AC and DC-to-DC voltage boosting power converters.

There are many applications, particularly in avionics, that require high-voltage (in the area of 10 kV), high-power output (in the area of 1.5 kW) power supplies. Often due to size, weight, or other limiting factors, the high-voltage power output must be generated from an existing, relatively lower voltage power supply. In such cases, a step-up or low-to-high-voltage boosting converter is typically used. Preferably, this boost converter should be capable of a wide range of output voltages so as to be adaptable to a wide variety of applications. Further, the design of the converter must necessarily be such that it does not interfere in the operation of the device being powered.

One class of commonly used power converters includes the numerous circuit variants of the basic inductive switched mode DC-to-DC voltage boosting converter. The basic switched mode converter is generally characterized as having a voltage gain that is directly related to the duty cycle of an applied converter control signal. This converter also characteristically has an output voltage ripple frequency that is approximately equal to the converter switch drive signal frequency. Voltage gain is here defined as the ratio of the converter output voltage to the converter input voltage. Duty cycle is here defined as the conduction period of the converter switch, responsive to the converter switch drive signal, to the total switch cycle period. As is well-known in the art, the voltage gain of the converter is given by the equation:

$$V_g = 1/(1-D)$$

where $V_g$ is voltage gain and D is duty cycle. Thus, based on this equation, an arbitrarily high-voltage gain can theoretically be obtained by the use of a converter switch drive signal having a duty cycle approaching unity. Also theoretically, any desirably high frequency of ripple in the output voltage potential, as required for non-interference with the device being powered, might be achieved by using a correspondingly high converter switch drive signal frequency.

In actual practice, however, there are a number of limitations on the voltage gain and ripple frequency, as well as the maximum output voltage and current, that can be realized when using the basic switched mode converter. In particular, both the maximum duty cycle and frequency of the converter switch drive signal are effectively limited by converter component and circuit non-idealities. That is, the power conversion efficiency and voltage gain of the converter begin to deteriorate rapidly whenever either an excessively high converter switch drive signal frequency or a duty cycle closely approaching unity, or both, are used.

The maximum output voltage and current are also limited by the converter components used. A typical switched mode converter utilizes an inductor to boost the converter input voltage. A switch, typically a transistor, is employed to charge the inductor by periodically shorting the converter input voltage through the inductor to ground or another reference voltage potential. In turn, when the switch is not conducting, the inductor impresses a boosted voltage potential across the switch. Thus, it is the collector to emitter, or equivalent, breakdown voltage and peak collector, or equivalent, current capacity that directly limits the maximum steady state voltage and current output of the converter. Consequently, the power transfer capability of the basic switched mode converter is also limited.

Another limitation associated with the use of the basic switched mode converter is that it does not provide a power isolated output. Power isolation is typically required between devices powered by the high-voltage power supply and those powered by the low-voltage power supply, from which the high-voltage supply is derived. Power isolation decreases the possibility of undesirable interference between the devices being powered and correspondingly increases their functional reliability.

Numerous circuit variants of the basic switched mode converter have been developed to avoid the above limitations. These variants typically employ an AC coupling transformer to provide power output isolation. An additional benefit of using an isolation transformer is that it can also be used to increase the voltage gain of the converter. By increasing the turns ratio of the secondary winding to the primary winding, the voltage potential across the secondary is proportionally increased with respect to the primary. Further, through the use of multiple secondary windings, the transformer can provide several isolated power outputs.

More elaborate variants have been designed specifically to provide high-voltage power outputs having substantially reduced output voltage ripple. A representative sampling of these circuit variants is shown in U.S. Pat. Nos. 4,251,087 and 4,184,197. Typically, these converter variants use either inductive filtering or inductively coupled feedback, or both, to improve the stability of the output voltage potential. This effectively reduces the possible interference of the switched mode converter with the operation of the device being powered and, therefore, avoids the need for excessively high converter switch drive signal frequencies.

These improved variants of the basic switched mode converter, however, are not without their disadvantages. For example, the addition of the transformer requires the converter circuit design to be modified so as to prevent DC saturation of the transformer core. DC saturation, as is well-known, would effectively inhibit the operation of the converter. This naturally results in an increase in converter design complexity, size, and weight and a corresponding decrease in converter power conversion efficiency.

Use of the transformer turns ratio to increase voltage gain also has the disadvantage of decreasing converter power conversion efficiency. The parasitic capacitance inherently present in the secondary winding is multiplied by the turns ratio squared and effectively reflected into the primary winding. This multiplied capacitance thereby acts as a substantial capacitive power load on the low-voltage power supply. Since this power is consumed by the converter, the overall power conversion efficiency is decreased.

SUMMARY OF THE INVENTION

The general purpose of the present invention is therefore to provide a multi-phase DC-to-AC voltage boosting converter suitable for use either alone or as the low-power, or primary, stage in a power isolated, high output voltage DC-to-DC voltage converter.

The general embodiment of the invention is comprised of a plurality of transformer primary windings electrically interconnected in a single loop mesh configuration and a plurality of voltage boosting channels, each phase-channel being operationaly associated with a separate primary winding and commonly connected to a low voltage power source. The phase-channels are operated so as to periodically provide a boosted voltage potential to the primary windings in a continuously cycling, multi-phase synchronous relationship to one another so that a corresponding multi-phase, high-voltage AC potential is provided across each of said primary windings.

A particular advantage of the present invention is its inherent flexibility. The DC-to-AC converter's design is compatible with a wide variety of AC-to-DC converters and voltage multiplier circuits. Thus, the converter is adaptable to a large number of applications requiring efficient DC-to-DC voltage boost power conversion.

Another advantage of the present invention is the simplicity of the basic converter configuration. This permits the use of a low number of non-critical parts and, consequently, provides a high degree of circuit reliability.

Still another advantage of the present invention is its ability to provide a number of power isolated high-voltage AC outputs through the use of a simple transformer configuration having multiple untapped primary windings.

Yet another advantage of the present invention is that its operation can be directly controlled by low-voltage, low-power multi-phase synchronous converter switch drive signals. This, in turn, permits direct regulation of the output voltage by altering the common duty cycle of the control signals.

BRIEF DESCRIPTION OF THE DRAWINGS

Further advantages and attendant features of the present invention will become apparent and readily appreciated as the same becomes better understood by reference to the following detailed description when considered in connection with the accompanying drawings, in which like reference numerals designate like parts throughout the figures, and wherein:

FIG. 1b is an ideal graphical representation of a converter switch drive signal that can be used to operate the DC-to-DC boost converter shown in FIG. 1a;

FIG. 2b is an ideal graphical representation of a three-phase set of converter switch drive signals that can be used to operate the preferred DC-to-AC embodiment of the present invention shown in FIG. 2a;

FIG. 5b is an ideal graphical representation of a five-phase set of converter switch drive signals that can be used to operate the alternate embodiment of the present invention shown in FIG. 5a.

DETAILED DESCRIPTION OF THE INVENTION

Figure 1A:
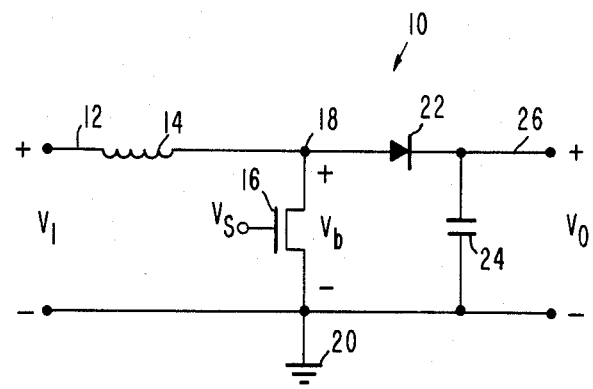
FIG. 1a is a circuit schematic of the basic inductive switch mode DC-to-DC boost converter.
Figure 1B:
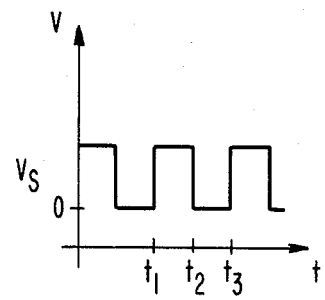

In order to gain a better understanding of the operation of the present invention, the design and operation of the basic switched mode DC-to-DC power converter, indicated in FIG. 1 by reference numeral 10, will first be described. The converter can roughly be separated into two sections: a voltage boost section formed by the inductor 14 and the switch 16, represented for purposes of illustration only as a FET transistor; and a half-wave rectifying and filtering section formed by the diode 22 and the capacitor 24. Operation of the circuit is controlled by a converter switch drive signal, typically a duty cycle variable pulse train such as shown in FIG. 1b, applied to the switch 16. During the conduction time of the transistor 16, the input voltage potential, $V_i$, provided on the power input terminal 12 is impressed across the inductor 14. When the transistor 16 is switched off, the polarity of the voltage potential appearing across the inductor 14 reverses and, in series summation with the input voltage potential, $V_i$, provides a boosted voltage potential, $V_b$, at node 18. Since the switch 16 is periodically operated, the voltage potential, $V_b$, appearing at node 18 is an AC voltage potential having a peak voltage potential that is inherently greater than the input voltage, $V_i$.

The value of the boosted voltage potential, $V_b$, appearing at node 18 is directly dependent on the duty cycle of the control signal applied to switch 16. Since the integral of the voltage appearing across the inductor over a complete operation cycle must be zero, as required for steady state operation, the use of increasingly higher duty cycles, providing longer periods of switch conduction time, will directly increase the peak current storage of the inductor 14. This results in a corresponding increase in the boosted voltage potential, $V_b$. The boosted voltage potential $V_b$ may then be used directly as a high-voltage AC potential source or, as in the converter circuit of FIG. 1a, it can be applied to the diode 22/capacitor 24 AC-to-DC conversion circuit to provide a high-voltage DC power output. The theoretical steady state voltage gain, $V_g$, of the DC-to-DC converter of FIG. 1a, as is well-known in the art, is given by the equation:

$$V_g = 1/(1-D).$$

Figure 2B:
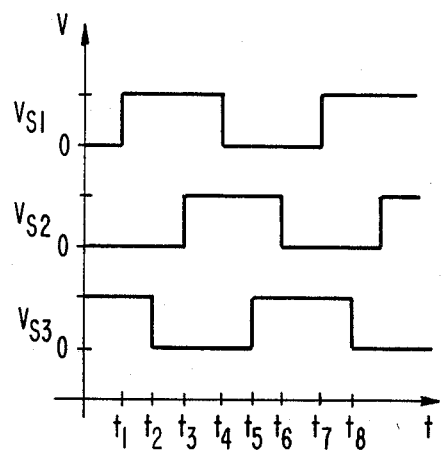
Figure 3:
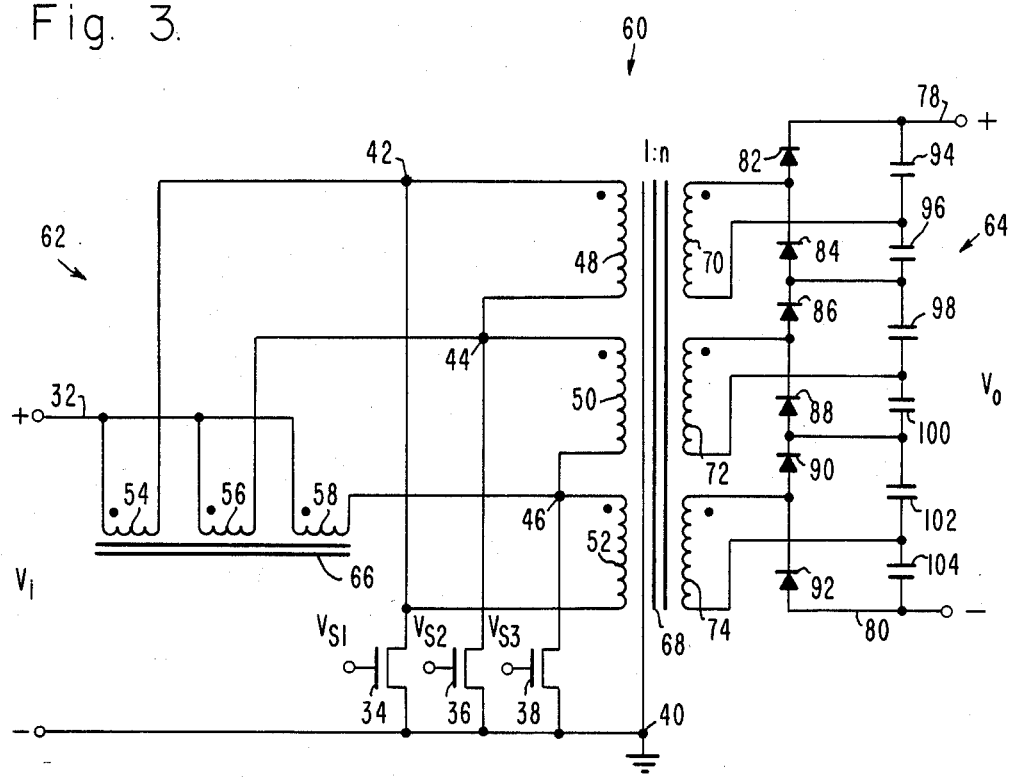
FIG. 3 is a circuit schematic of the preferred DC-to-DC boost converter embodiment of the present invention.
Figure 2A:
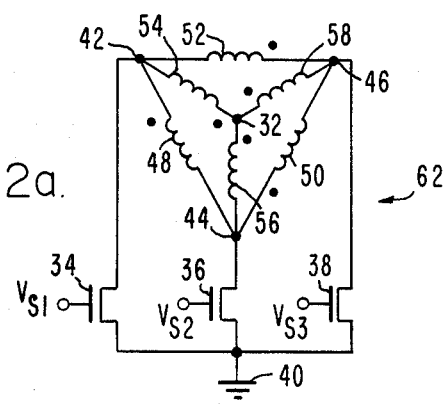
FIG. 2a is a simplified circuit schematic of the preferred multi-phase DC-to-AC boost converter embodiment of the present invention.

Referring now to FIG. 2a, a simplified circuit schematic of the preferred embodiment of the present invention is shown. The preferred embodiment of the invention is also shown in FIG. 3 as part of the complete DC-to-DC boost converter 60. The converter 60 of FIG. 3 is comprised of the preferred primary stage DC-to-AC boost converter circuit 62 and a well-known six-fold diode capacitor voltage multiplying AC-to-DC converter circuit 64.

Returning to FIG. 2a, the preferred 3-phase primary stage DC-to-AC converter 62 is composed of three essentially identical phase-channels. Each has an inductor 54, 56, 58, and an associated transformer primary winding 48, 50, 52, respectively. The inductors 54, 56, 58 are electrically connected between a common low voltage power input node 32 and a transformer primary winding node 42, 44, 46, respectively. The three primary windings 48, 50, 52 are electrically connected at these winding nodes to form a single loop mesh, or "delta", transformer winding configuration. Each phase-channel further includes a switch 34, 36, 38, respectively, represented for purposes of illustration as a FET transistor in the various FIGS. The switches 34, 36, 38 are connected between their respective phase-channel winding nodes 42, 44, 46 and a common ground reference node 40. A converter switch drive signal source (not shown) is used to generate the synchronous three-phase square wave converter switch drive signals shown in FIG. 2b, $t_1$ through $t_7$ comprising a single complete cycle. These signals are applied separately to each of the phase-channel switches 34, 36, 38, respectively, so as to control their electrical operation.

The simplified circuit schematic of the preferred three-phase DC-to-AC boost converter 62 of FIG. 2a graphically illustrates the single loop mesh configuration of primary windings which is characteristic of all embodiments of the present invention. Also illustrated is the distinctive delta-Y configuration of transformer windings 48, 50, 52 and inductors 54, 56, 58 of the preferred embodiment of the present invention.

Figure 4:
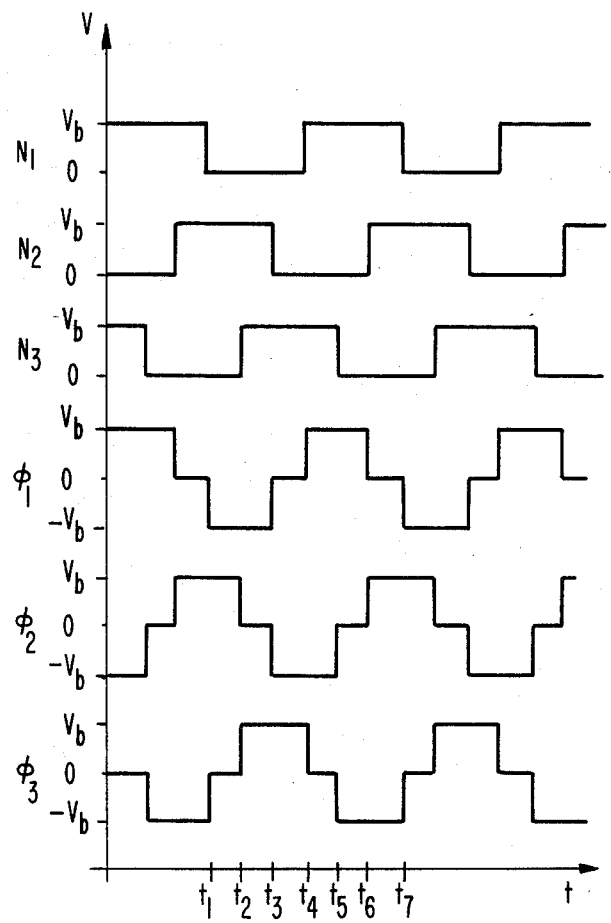
FIG. 4 is an ideal graphical representation of the corresponding node and phase winding voltages present during the operation of the preferred embodiment of the present invention when driven by the converter switch drive signals shown in FIG. 2b.

For convenience, the operation of the preferred three-phase embodiment of the invention will be described in detail with reference to its simplified circuit schematic, shown in FIG. 2a, the converter switch drive signal waveforms, shown in FIG. 2b, and the several voltage waveforms, shown in FIG. 4, which describe the pertinent operative conditions of the circuit 62 for a complete cycle of operation.

The three-phase converter switch drive signal generator is electrically connected to each of the switches 34, 36, 38, and separately drives them between conducting and non-conducting states. In the preferred embodiment, the phase synchronous switch drive signals are duty cycle variable square waves that are synchronously 120° out of phase with one another. A representative set of control signals $V_{s1}$, $V_{s2}$, $V_{s3}$ having a 50% duty cycle is shown in FIG. 2b.

Considering now the operation of the preferred embodiment of the present invention, immediately prior to the time $t_1$ only the converter switch drive signal $V_{s3}$ is at a voltage potential sufficient to drive its corresponding switch 38 into a conductive, or "on", state. The other two converter switch drive signals $V_{s1}$, $V_{s2}$ are at voltage potentials such that their corresponding switches 34, 36 are in an "off" state. At $t_1$, the converter switch drive signal $V_{s1}$ drives its corresponding switch 34 into the "on" state, thereby forcing winding node 42 to the ground or common reference voltage potential. The node voltages $N_1$, $N_2$, $N_3$ of the winding nodes 42, 44, 46, respectively, are shown in FIG. 4. As with the basic switched mode converter, forcing the winding node 42 to the ground potential causes the input voltage potential $V_i$, present at the power input node 32, to be impressed across the inductor 54. Consequently, the magnitude of the current through the inductor 54 then begins to ramp up over time from its initial condition as the magnitude of the energy stored in the inductor 54 correspondingly increases. The total increase in energy stored is therefore dependent on the conduction time of the switch 34 which is, in turn, dependent on the duty cycle of the converter switch drive signal $V_{s1}$. In the present example, a 50% duty cycle is shown as being used. Thus, at $t_4$ the switch 34 turns off in response to the converter switch drive signal $V_{s1}$. The polarity of the voltage potential across the inductor 54 instantaneously reverses as the inductor begins to discharge its stored energy. The boosted voltage potential, $V_b$, that appears at winding node 42 is therefore the serial summation of the input voltage potential, $V_i$, and the voltage developed across the inductor 54. The magnitude of this latter voltage potential is directly proportional to the discharge time of the inductor 54 and, therefore, also on the duty cycle. This condition is inherent in the requirement that, for steady state operation of the converter 62, the net storage of current or energy in the inductors 54, 56, 58 over time must be zero. Thus, the inductor discharge voltage potential during the off period of the associated switch must be sufficient to support the complete discharge of the additional current effectively stored in the inductor during the on period of the associated switch. This results in the inductor voltage potential being inversely proportional to the inductor discharge time. Consequently, the boost potential, $V_b$, can be made many times greater than the input voltage potential, $V_i$, simply by increasing the duty cycle of the converter switch drive signals.

The discharge current conduction paths of the inductors 54, 56, 58 are through the several transformer windings 48, 50, 52. The phase voltage potentials $\phi_1$, $\phi_2$, $\phi_3$ appearing across these windings 48, 50, 52, respectively, are shown in FIG. 4. The polarities of the phase voltages $\phi_1$, $\phi_2$, $\phi_3$ are dependent on the relative orientation of the windings 48, 50, 52, consistent with the standard dot convention. The available discharge current conduction paths are determined by the converter switch control signals based on which of their corresponding switches are on. Considering winding node 42 at $t_4$, the only available conduction path is through winding 48 and node 44, as grounded by switch 36. A second conduction path becomes available at $t_5$, through winding 52 and node 46, as switch 38 turns on. These respective conduction paths remain available until $t_6$, when switch 36 turns off, and $t_7$, when switch 34 turns on, ending the inductor 54 discharge portion of the cycle $t_1$–$t_7$. Further, due to the orientation of these windings 48, 52, the phase voltages $\phi_1$, $\phi_3$ are positive and negative, respectively, as shown in FIG. 4. The magnitude of the phase voltages $\phi_1$, $\phi_3$ will remain substantially constant at approximately the boosted voltage potential, $V_b$, for the cycle periods $t_4$–$t_6$ and $t_5$–$t_7$, respectively. This is based on the preferable condition that the converter switch drive signal frequency is sufficiently high relative to the current discharge time constant of the conduction paths such that the current discharge is substantially linear and the capacitor voltage potentials are substantially constant.

It is important to realize that the inductor charge and boosted-voltage current discharge conditions, discussed above with regard to winding node 42, also exist at the remaining winding nodes 44, 46. The only difference is that these conditions exist at each of the nodes 42, 44, 46 120° out of phase relative to one another. Consequently, each transformer winding is impressed with a stepped, square wave AC waveform having a peak-to-peak phase voltage potential of twice the boosted voltage potential, $V_b$. These waveforms are correspondingly displaced in time relative to one another as shown in FIG. 4. The stepped effect results from the fact that there exist periods when both terminals of a winding 48, 50, 52, are at a common voltage potential due to the partially overlapping nature of the successive winding node voltage waveforms. This results in a zero net voltage being periodically impressed across each of the windings 48, 50, 52. Naturally, this requires the successive converter switch drive signals to, at a minimum, overlap but, conversely, not to completely overlap one another. For the preferred three-phase converter, the duty cycle of the converter switch drive signals must therefore be constrained to between 33.33% and 66.66%. Considering, alternate embodiments of the present invention involving greater numbers of phase-channels, this requirement may be generalized to simply requiring the duty cycle of the converter switch drive signals to be maintained between $1/N$ and $N-1/N$, where N is the number of phase-channels being used.

Inherently then, the present invention possesses a number of distinctly desirable characteristics. They include a voltage gain twice that of the basic switched mode converter, shown in FIG. 1, and general circuit variants thereof when operated with converter switch drive signals of comparable frequency and duty cycle. The AC voltage potentials appearing across the windings 48, 50, 52 have a zero DC bias potential, since the windings 48, 50, 52 experience both positive and negative voltage excursions of equal period and magnitude relative to the ground node 40. This remains true even though the duty cycle of the switch drive signals may be altered. Consequently, the AC peak-to-peak voltage potential impressed across each transformer winding is twice the boosted voltage potential, $V_b$. Further, since the AC waveform has a zero DC bias, the waveform can be directly applied to the transformer without causing DC saturation of the transformer magnetic core.

Also inherent in the present invention is the fact that the isolation transformer can be made significantly smaller, lighter, and more efficient than a comparable transformer used in circuit variants of the basic switched mode converter. As shown in FIG. 3, both the primary 48, 50, 52 and secondary 70, 72, 74 windings of the transformer 68 may be wound onto a common magnetic core. Due to the balanced AC voltage potentials impressed across each of the primary windings 48, 50, 52, there are both positive and negative flux excursions that fully exercise the transformer magnetic core material. This allows the full utilization of a maximum amount of core material. In addition, the transformer retains the inherent volumetric efficiency of a three, or more, phase converter system over a single phase converter system. Thus, the present invention requires a minimum amount of core material in the construction of the transformer while utilizing the transformer 68 at maximum efficiency. The inductors 54, 56, 58 may likewise be wound onto a common core 66 with a corresponding savings in the size and weight of the inductors and a corresponding increase in their efficiency.

The present invention also utilizes the characteristic ground referenced switch and inductor arrangement of the basic switched mode converter. This allows the use of either grounded emitter bipolar or grounded source FET power transistors as the switches which, in turn, substantially simplifies the necessary driving circuitry of the converter switch drive signal generator. However, this switch arrangement, in combination with the multi-phase operation of the switches, permits a substantial reduction in power dissipation during switching and a sharing of current loading between the switches. The current surge and corresponding dissipation of power during switching is the primary cause of switch failure. The limited current and power handling capability of the switch therefore directly limits the power conversion capability of the converter. In the present invention, a neighboring switch will always be conducting when another begins or ceases conduction, as is apparent from FIG. 2b. Since the inductors, as they discharge, effectively act as constant current sources, current will be shared by the switches during switching with an approximately 50% reduction in power dissipation in each switch as it switches. Consequently, the power conversion capacity of the present invention is inherently greater than that of the basic switched mode and other similar converters.

The present invention is also highly flexible in that it can operate either alone, as an efficient, high gain DC-to-AC boost converter, or in combination with a wide variety of secondary stage AC-to-DC converters and voltage multipliers. The preferred embodiment of the complete DC-to-DC converter 60 is shown in FIG. 3. The AC-to-DC secondary stage 64 incorporates a six-fold voltage multiplier of a conventional design previously described in U.S. Pat. No. 3,121,835. This diode capacitor voltage multiplier 64 separately rectifies, and filters the AC voltage potential appearing at each of the three transformer secondary windings 70, 72, 74. The particular configuration of the diode rectifiers, 82, 84, 86, 88, 90, 92 and the filter capacitors 94, 96, 98, 100, 102, 104 provides multiple capacitor charging paths such that the AC voltage potential appearing across each of the transformer secondary windings is separately converted to a DC voltage potential approximately twice the peak AC voltage potential. Thus, by serial summation of the voltage potentials appearing across each of the capacitors 94, 96, 98, 100, 102, 104, a single high-voltage potential, $V_o$, is developed between the power supply output terminals 78, 80. Thus, the secondary stage 64 provides an additional gain of six to the overall DC-to-DC converter combination. Also, since the AC voltage potentials are 120° out of phase with one another, the ripple frequency of the DC output voltage potential, $V_o$, is effectively triple the frequency of the converter switch drive signals.

Another consequence of the AC voltage potential phasing is that there is an uninterrupted flow of current from the primary to the secondary stage of the converter. That is, at least one of the primary windings always has a boosted voltage potential across it at any given time. Thus, current is constantly being supplied through at least one of the phase channels of the primary stage 62 to the secondary stage 64.

While the preferred DC-to-DC converter embodiment of the present invention utilizes this particular voltage multiplying AC-to-DC converter secondary stage, practically any AC-to-DC converter or voltage multiplier circuit may be employed without affecting the operation of the primary stage DC-to-AC boost converter 62. An alternate secondary stage of conventional design may provide several high voltage power outputs that are isolated from one another and from the low-voltage power input supply by paralleling separate AC-to-DC converters from each of the secondary windings. The only restriction on the design of a secondary stage, such as the secondary stage 64, is that it must utilize secondary windings wound with a common orientation to each of the primary windings 48, 50, 52 when wound on the common magnetic core 68.

A complete prototype 3-phase DC to DC boost converter has been constructed based on the circuit design shown in FIG. 3. Built as a single unit, the converter was immersed in an oil dielectric occupying a container of approximately 300 cubic inches. Operating from an input voltage potential, $V_i$, of a 150 volts, at a duty cycle of 50%, and using a transformer turns ratio of 1:3, the converter provided an output voltage potential, $V_o$, of 10 kilovolts at a power supply level of 1.5 kilowatts. The measured power conversion efficiency of the converter was greater than 90%.

Another distinctive characteristic of the present invention is its simplicity of design. While the three-phase DC-to-AC converter embodiment represents the preferred configuration, the present invention is readily extensible to provide DC-to-AC converters having any greater number of phases. These higher order embodiments are characterized as having like numbers of inductors, transformer primary windings, and switches in a corresponding number of identical phase-channels; the primary windings being connected in a single loop mesh configuration, and the switches being controlled by a corresponding number of synchronously phased converter switch drive signals.

Figure 5B:
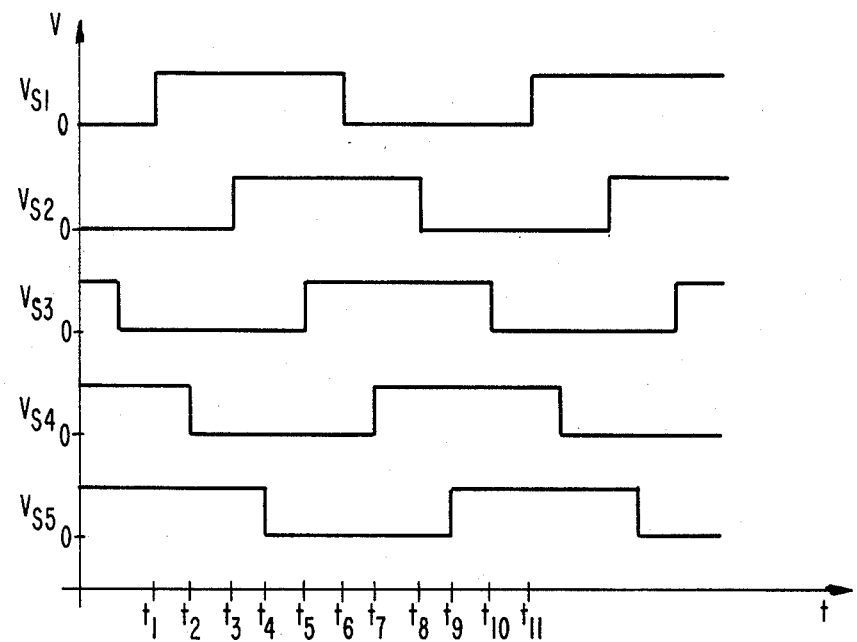
Figure 5A:
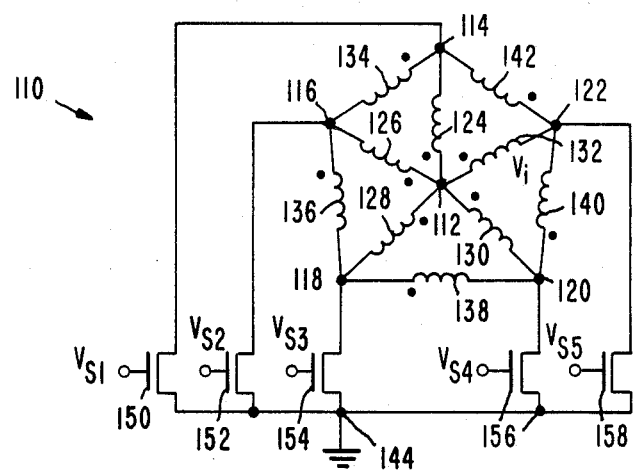
FIG. 5a is a simplified circuit schematic of an alternate multi-phase embodiment of the present invention.

A five-phase alternate primary stage embodiment of the present invention, indicated by the reference numeral 110, is shown in FIG. 5a. A "star" of inductors 124, 126, 128, 130, 132 are connected between the input voltage potential node 112 and the winding nodes 114, 116, 118, 120, 122 of the single loop mesh configured primary windings 134, 136, 138, 140, 142. Each of the winding nodes 114, 116, 118, 120, 122 are further connected to the switches 150, 152, 154, 156, 158 in strict analogy to the basic design of the three-phase embodiment of the present invention. The five-phase set of converter swith drive signals, shown in FIG. 5b, are suitable for properly operating the converter 110. The three-phase DC-to-AC converter, however, is preferred as the minimum converter configuration retaining all the above described desirable qualities while possessing the lowest parts count and, therefore, the highest circuit reliability and overall converter efficiency, relative to either higher order embodiments of the present invention or to any comparable circuit variant of the basic switched mode converter.

Thus, there has been described a new class of highly flexible DC-to-AC and DC-to-DC converters having an intrinsically high-voltage gain and further characterized as operating in a mutli-phase mode and utilizing a single loop, mesh arrangement of transformer primary windings.

Obviously, many modifications and variations of the present invention are possible in light of the above teachings. It is therefore to be understood that, within the scope of the appended claims, the invention may be practiced otherwise than as specifically described.

What is claimed is:

1. A multi-phase voltage boost converter comprising:
   (a) a plurality of transformer primary windings electrically interconnected in a single loop mesh configuration;
   (b) a plurality of voltage boosting phase-channels electrically connected with said primary windings and commonly connected to a low voltage power source; and
   (c) means for controlling said phase-channels such that each said phase-channel periodically provides a boosted voltage potential to said primary windings, the periodic boosted voltage potential being provided in a continuously cycling, multi-phase synchronous relationship to one another so that a corresponding multi-phase, high-voltage AC potential appears across each of said primary windings.

2. The converter of claim 1 wherein each said phase-channel includes:
   (a) an inductor electrically connected between said low voltage power source and a respective electrical interconnection node between any two of said primary windings; and
   (b) a switch electrically interconnected between said respective node and a ground reference voltage potential, said switch being operatively associated with said control means such that said switch periodically conductively connects said respective node to said ground reference potential.

3. The converter of claim 2 wherein said control means generates a plurality of converter switch drive signals having a continuously cycling, multi-phase synchronous relationship to one another, each of said switch drive signals being operatively associated with a separate one of said phase-channels.

4. The converter of claim 3 wherein said switch drive signals generated by said control means are substantially square wave signals of commonly variable duty cycle, the conduction period of said switches being directly responsive to the duty cycle of said switch drive signals.

5. The converter of claim 4 wherein the duty cycle of said switch drive signals are variable between $1/N$ and $N-1/N$, where N equals the number of said switch drive signals.

6. The converter of claim 5 wherein the switch of each said phase-channels includes a power switching transistor.

7. The converter of claim 6 wherein the number of said phase-channels and said primary windings is three, respectively.

8. An N-phase low-to-high voltage DC-to-DC converter comprising:
   (a) a primary N-phase DC to AC boost converter stage including:
      (1) means for generating a low-voltage DC voltage potential difference between a first and a second input terminal;
      (2) N primary transformer windings electrically connected at N winding nodes in a single loop mesh configuration;
      (3) N identical phase-channels, each said phase channel including an inductor electrically connected between said first input terminal and a separate one of said winding nodes and a switch electrically connected between said winding node and said second input terminal for selectively shorting said winding node to said second input terminal; and
   (b) a secondary AC-to-DC converter stage including:
      (1) at least one secondary transformer winding inductively coupled to each said primary transformer winding; and
      (2) means for converting a high AC voltage potential induced in each of said secondary windings to a corresponding DC voltage potential, said means including conventional AC-to-DC converter and voltage multiplier circuits, so that at least one high-voltage, isolated DC power output is provided.

9. The converter of claim 8 further comprising means for generating N switch drive signals having a cyclic, phase synchronous relationship to one another, each said signal being operatively associated with a separate one of said phase-channels and, in particular, with said switch contained therein, the operation of each said switch being directly related to the duty cycle of its respective switch control signal.

10. The converter of claims 8 or 9 wherein each said switch includes a power switching transistor.

11. A 3-phase DC-to-AC boost converter comprising:
(a) means for generating an input DC voltage potential difference between a power input node and a ground reference node;
(b) three transformer primary windings electrically connected at winding nodes to form a delta connected network;
(c) three inductors each being electrically connected between said power input node and a separate one of said winding nodes so as to form a wye configuration within said delta configured network of primary windings; and
(d) three switches, each being electrically connected between a separate one of said winding nodes and said ground reference node.

12. The converter of claim 11 wherein:
(a) said converter includes means for generating a cyclic, phase synchronous set of 3-phase square wave signals; and
(b) each said switch includes a power switching transistor operatively responsive to a separate one of said 3-phase square wave signals.

* * * * *